United States Patent Office 3,228,970
Patented Jan. 11, 1966

3,228,970
N-METHYL-N-METHOXY AMINOSULFONIC ACID AND SALTS THEREOF
Donald L. Smathers, Claymont, Del., assignor to E. I. du Pont de Nemours and Company, Wilmington, Del., a corporation of Delaware
No Drawing. Filed Sept. 4, 1964, Ser. No. 394,615
5 Claims. (Cl. 260—453)

This application is a continuation-in-part of my application Serial No. 257,880, filed February 12, 1963 (now abandoned), which in turn is a continuation-in-part of my application Serial No. 827,174, filed July 15, 1959 (now abandoned).

This invention relates to N-methyl-N-methoxyaminosulfonic acid and its salts. This invention further relates to the preparation of the aforementioned sulfonic acid and its salts, to processes using them as herbicides or bactericides and to compositions containing them.

The novel compound of the invention is N-methyl-N-methoxyaminosulfonic acid of the structure:

(1)

The sulfonic acid can be converted to, or prepared as, its salts, such as those of calcium, sodium, potassium, ammonium, lower alkyl ammonium such as ethylammonium, dimethylammonium, trimethylammonium and ethanolammonium.

The novel compound of the invention can be used as a chemical intermediate, as will be illustrated hereafter, and can, for example, be converted by hydrolysis and thereafter by reaction with an appropriate aryl isocyanate to produce herbicides.

This compound and its salts can be used for the control of woody vines such as poison ivy (1 to 3 pounds active per gallon of water) and woody brush such as willow, alder, oak, ash and birch at dosages of 60 to 80 pounds active per 100 gallons of water. They also can be used for general weed control on annual and perennial weeds such as crabgrass, cocklebur, lambsquarters, chickweed and yellow or green foxtail at rates of ¾ to 1½ pounds per gallon of water. In all cases, the herbicidal solution is applied to foliage to thoroughly wet the foliage.

For such uses the compounds may be formulated as oil-in-water or water-in-oil emulsions. They may be used as aqueous dispersions or admixed with carriers to form granules.

The compound of this invention and its salts, can also be used to inhibit the growth of specific gram positive bacteria such as Bacillus subtilis and Staphylococcus aureus. Concentrations as low as 500 micrograms per milliliter are effective for this use.

The N-methyl-N-methoxyaminosulfonic acid and its salts can be prepared by either of two novel processes which are shown, somewhat briefly, in the following scheme:

Process A
(2)
NaNO₂+NaHSO₃+SO₂ ⟶

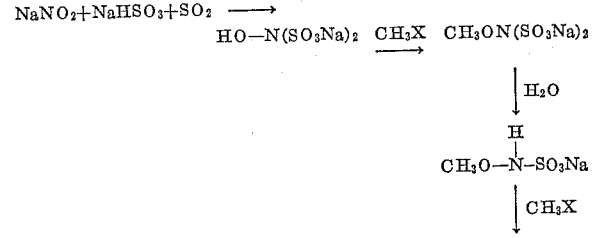

Process B
(3)

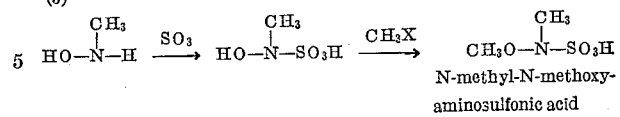

N-methyl-N-methoxy-
aminosulfonic acid where

X is I⁻, Br⁻, Cl⁻, or ½(SO₄⁼)

The N-methyl-N-methoxyaminosulfonic acid thus prepared can be hydrolyzed and reacted with an aryl isocyanate to produce a corresponding 3-aryl-1-methoxy-1-methylurea. Such ureas constitute a group of valuable herbicides.

(4)
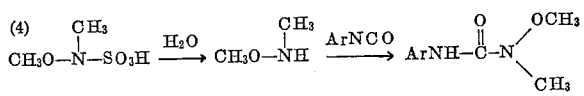

The preparation of N-methyl-N-methoxyaminosulfonic acid by the process of this invention is a four-step sequence of reactions as follows:

(1)   NaNO₂ + NaHSO₃ + SO₂ ⟶ HON(SO₃Na)₂
sodium    sodium     sulfur      disodium hydroxy-
nitrite   bisulfite  dioxide     iminodisulfonate (2)
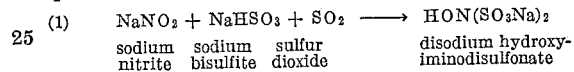
disodium methoxy-
iminodisulfonate (3)
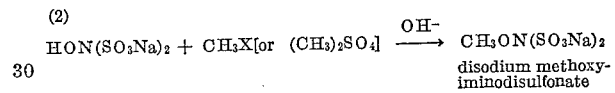
sodium N-methoxyaminosulfonate (4)
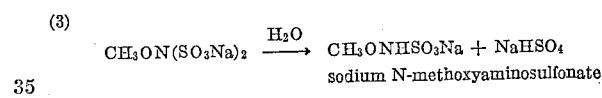
sodium N-methyl-N-methoxy-
aminosulfonate where X equals I⁻, Br⁻, Cl⁻, or ½(SO₄⁼)

The potassium salts can be employed instead of the sodium salts in Equations 1–4 to provide analogous results.

A major feature of this invention is that all four reactions can be performed on one reaction vessel, requiring no isolation of intermediates. However, for clarity and simplicity, the four reactions are discussed separately below.

PROCEDURE AND PROCESS VARIABLES
FOR REACTION 1

To a solution of between 600 and 800 (preferably 690) parts by weight of an alkali nitrite (preferably sodium or potassium nitrite) in between 2000 and 8000 (preferably 2000) parts of water, or optionally with an equivalent weight of ice taking the place of all or part of the water, is gradually added a solution of between 320 and 1200 (preferably 1040) parts of sodium or potassium bisulfite in between 1200 and 1800 (preferably 1400 to 1600) parts of water, keeping the temperature between —5° C. and +5° C. (preferably between —5° C. and —2° C.) throughout the addition. When addition is complete, about 590 parts of sulfur dioxide is passed through the reaction solution, observing the above temperature range, until the solution gives an acid reaction to Congo red paper.

PROCEDURE AND PROCESS VARIABLES FOR REACTION 2

Reaction a is carried out directly on the solution from Reaction 1. Between 1 and 2 molecular equivalents (based on alkali nitrite) of an alkali or alkaline earth base (preferably sodium or potassium hydroxide) is added all at once. Subsequent procedure will depend on whether a methyl halide or dimethyl sulfate is used.

(a) *Methyl halide.*—The reaction vessel is capped and between 1 and 20 (preferably 2 to 6) molecular equivalents of a methyl halide (preferably the chloride) is added. Operating at autogenous pressures (for practical operation the capacity of the reaction vessel should be no more than three times the volume of contained solution) the system is heated to temperatures between 70° C. and 140° C. (preferably 90° C. to 100° C.) stirring well to insure proper mixing. This treatment is continued until reaction is complete (one to six hours, depending on the reactivity of the methyl halide used), whence excess methyl halide is removed by steam distillation.

(b) *Dimethyl sulfate.*—Between 0.5 and 3.0 (preferably 2.4 to 3.0) molecular equivalents of dimethyl sulfate is added to the stirred solution. The temperature rises spontaneously. When the spontaneous reaction subsides, the reaction solution is heated to temperatures between 30° C. and 60° C. (preferably 40° C. to 50° C.) to complete the reaction.

PROCEDURE AND PROCESS VARIABLES FOR REACTION 3

Reaction 3 is carried out directly on the reaction solution from Reaction 2. Sufficient strong acid (preferably sulfuric acid) is added to adjust the solution to the range pH 3 to pH 1 (preferably pH 1 to pH 1.5). The solution is then heated at temperatures between 65° C. and 140° C. (preferably 90° C. to 110° C.), capping the system to reach the higher temperatures, for a period of from one to six hours (preferably one to two hours).

PROCEDURE AND PROCESS VARIABLES FOR REACTION 4

Reaction 4 is carried out directly on the reaction solution from Reaction 3. The reaction vessel is capped and a concentrated aqueous solution of an alkali or alkaline earth base (preferably sodium or potassium hydroxide) is added so that the solution is adjusted to pH 6–11 (preferably pH 8–10).

While maintaining the well-stirred reaction solution at temperatures between 70° C. and 140° C. (preferably between 90° C. and 100° C.) and operating at autogenous pressure, between 1 and 20 (preferably 2 to 6), molecular equivalents of a methyl halide (preferably the chloride) are added. [Alternatively, between 0.5 and 1.5 (preferably 0.8 to 1.1 molecular equivalents of dimethyl sulfate are added.] Stirring is continued until reaction is complete (one to six hours, depending on the reactivity of the alkylating agent), adding base as needed to maintain the solution in the above given pH range.

After completion of the reaction, the system is cooled and vented. The resulting solution of sodium or potassium N-methyl-N-methoxyaminosulfonate, containing by-product sodium or potassium salts, may be used directly for the applications of this invention.

For example, if it is desired to obtain N-methyl-N-methoxyamine, sufficient strong acid (preferably sulfuric acid) is added to bring the solution into the range of pH 3 to pH 0.5 (preferably pH 1). Heating is continued at 100° C. to 105° C. for a period of from 4 to 6 hours (preferably 6 hours), whereupon the reaction solution is cooled.

The resulting solution of N-methyl-N-methoxyamine (present as the sulfate salt) may be used directly for the preparation of a variety of useful derivatives, such as the herbicidally active 1-methoxy-1-methyl-3-aryl-ureas. If it is desired to isolate the free amine, the reaction solution is cooled to temperatures between 5° C. and 40° C. (preferably 10° C.–20° C.), sufficient aqueous base (preferably sodium hydroxide) is added to adjust the solution to pH 8 or greater, and the amine is recovered by distillation.

The following are examples of the synthesis and use of the compounds of this invention by the process just described.

*Example 1.—Sodium N - methyl - N-methoxyaminosulfonate using dimethyl sulfate as the alkylating agent*

To a stirred mixture of 630 parts by weight of sodium nitrite and 5000 parts of crushed ice is gradually added a precooled (0°–5° C.) solution of sodium bisulfite, prepared by saturating with sulfur dioxide a solution of 495 parts of sodium carbonate in 1500 parts of water. When addition is complete, a stream of sulfur dioxide is passed in, at 0° C.–2° C. until an acid reaction to Congo red paper is obtained. Without cooling, a solution of 380 parts of sodium hydroxide in 600 parts of water is rapidly added, followed immediately by the rapid addition of 1100 parts of dimethyl sulfate. When the spontaneous reaction subsides, heating is commenced so that the reaction solution is maintained at temperatures between 50° C. and 60° C. After 30 minutes' stirring at this temperature, sulfuric acid is added to adjust the solution to pH 1–1.5. The acidic solution is refluxed for 1.5 hours, cooled slightly and the reaction vessel is fitted for pressure operation. Concentrated aqueous sodium hydroxide is added to the reaction solution until the solution is at pH 8–10. Keeping the temperature betweent 90° C. and 100° C., 1100 parts of dimethyl sulfate is gradually added to the reaction solution, simultaneously with aqueous sodium hydroxide as needed to maintain the solution in the range of pH 8–10. When addition is complete, the reactants are stirred one hour longer.

The resulting aqueous solution of sodium N-methyl-N-methoxyaminosulfonate may be used directly for the applications of this invention, or it may be concentrated somewhat by evaporation and then used for said applications.

Substitution of equivalent parts of the potassium salt for the sodium salt in the above procedure produces the potassium N-methyl-N-methoxyaminosulfonate.

*Example 2.—Sodium N - methyl - N-methoxyaminosulfonate using methyl chloride as the alkylating agent*

An aqueous solution of hydroximidodisulfonate is prepared as in Example 1. Without cooling, a solution of 380 parts of sodium hydroxide in 600 parts of water is rapidly added. The resulting solution is heated to 90° C. to 100° C.; the reaction vessel is closed for pressure operation and 2600 parts of methyl chloride is added. (For most economical operation, the capacity of the reaction vessel should not be greater than about three times the volume of the reaction solution.) When reaction is complete, the reaction vessel is vented, excess methyl chloride being recycled into subsequent runs. Sufficient concentrated sulfuric acid is added to adjust the solution to pH 1–1.5. The acidic solution is refluxed for 1.5 hours, then cooled slightly, and the reaction vessel is again fitted for pressure operation. Concentrated aqueous sodium hydroxide is added to the reaction solution until the solution is at pH 8–10. Keeping the temperature between 90° C. and 100° C., 2600 parts of methyl chloride is added. When reaction is complete, concentrated sulfuric acid is added in until the solution is at pH 1–1.5. The reaction vessel is vented, excess methyl chloride being recycled into subsequent runs. The resulting solution of N-methyl-N-methoxyaminosulfonic acid may be used directly for the applications of this invention.

The free acid can be obtained by conventional extraction procedures, such as extraction with methylene chloride or other suitable immiscible solvent, followed by evaporation of the solvent. The free acid so obtained can be readily converted to metal salts by interaction with the metal carbonate or to amine salts by addition to the amine.

The preparation of N-methyl-N-methoxyaminosulfonic acid, or its salts by the process of this invention is a two-step sequence of reactions as follows:

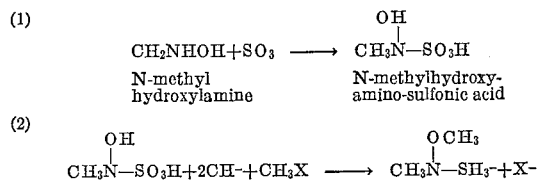

X equals hydrogen, $(SO_4=)\frac{1}{2}$

A major feature of this invention is that both reactions can be performed in one reaction vessel, requiring no isolation of intermediates. However, for clarity and simplicity, each reaction is separately discussed in detail below.

PROCEDURE AND PROCESS VARIABLES FOR REACTION 1

To a well-stirred 5% to 35% (preferably 15% to 25%) by weight chloroform solution of N-methylhydroxylamine, maintained at temperatures between 0° C. and 30° C. (preferably 5° C. to 15° C.), is gradually added one molecular equivalent (based on N-methylhydroxylamine) of sulfur trioxide. Reaction is essentially complete when the addition is finished.

In place of sulfur trioxide, other sulfonating agents, such as chlorosulfonic acid, oleum, or a tertiary amine-sulfur trioxide complex, may be satisfactorily employed.

PROCEDURE AND PROCESS VARIABLES FOR REACTION 2

Reaction 2 is carried out directly on the reaction mixture from Reaction 1. At temperatures between 0° C. and 30° C. (preferably 0° C.–10° C.), a total of one to three (preferably 1.5 to 2) volumes of water is gradually added. Maintaining the above temperature range, a concentrated aqueous solution of an alkali or alkaline earth base (preferably sodium hydroxide) is gradually added, until one to four (preferably 1.5–2.5) molecular equivalents of base have been introduced. Stirring is stopped. The lower phase is tapped off and discarded or recycled to the next reaction batch. Stirring is resumed. Subsequent procedure will depend on whether dimethyl sulfate or a methyl halide is chosen for the methylating agent.

(a) *Dimethyl sulfate.*—To the well-stirred reaction solution is added between 0.5 and 2 (preferably 0.8–1.2) molecular equivalents of dimethyl sulfate without cooling. Simultaneously, more base is added as needed to maintain the solution at a pH greater than 8, and heat is applied, so that the mixture is in the temperature range of 25° C.–100° C. (preferably 80° C.–90° C.). Reaction is essentially complete in ¼–4 hours, depending on the substrate.

(b) *Methyl halide.*—The well-stirred reaction solution is heated to temperatures between 60° C. and 100° C. (preferably 80° C.–95° C.) and the reaction vessel is capped. Between 1 and 20 (preferably 2 to 6) molecular equivalents of a methyl halide (preferably the chloride is added. The reaction, carried out at autogenous pressure, is more practical if the capacity of the reaction vessel does not exceed about three times the volume of the reaction solution. Reaction is complete in 1 to 12 hours, depending on the reactivity of the methyl halide used. Excess methyl halide is removed (by steam distillation, if necessary) at normal atmospheric pressure.

The following examples typify synthesis of the compound of the invention by the process just described.

*Example 3.—Sodium N-methyl-N-methoxyaminosulfonic acid, using sulfur trioxide as the sulfonating agent*

To a stirred solution of 47 parts by weight of N-methylhydroxylamine in 900 parts of chloroform, is gradually added 80 parts of sulfur trioxide, keeping the reaction solution at 5° C. to 15° C. throughout the addition. When addition is complete, 1200 parts of water is gradually added at 0° C. to 10° C. followed by the addition of a solution of 80 parts of sodium hydroxide in 100 parts of water, also at 0° to 10° C. Twenty minutes after addition is complete, stirring is halted. The lower layer is tapped off and recycled into subsequent runs. The upper layer is stirred while adding 126 parts of dimethyl sulfate, without cooling. When addition is complete, the reaction mixture is heated to 80° C. to 90° C. simultaneously adding concentrated aqueous sodium hydroxide as needed to keep the solution at a pH greater than 8. When reaction is complete, the reaction solution is allowed to cool.

The resulting aqueous solution of sodium N-methyl-N-methoxyaminosulfonate may be used directly for the applications of this invention.

*Example 4.—Sodium N-methyl-N-methoxyaminosulfonate, using chlorosulfonic acid as the sulfonating agent*

To a stirred solution of 47 parts by weight of N-methylhydroxylamine and 220 parts of triethylamine in 900 parts of chloroform, is gradually added 117 parts of chlorosulfonic acid. When addition is complete, 1200 ml. of water is gradually added at 0° C. to 10° C., followed by the addition of a solution of 120 parts of sodium hydroxide in 150 parts of water, also at 0° C. to 10° C. Twenty minutes after addition is complete, stirring is halted. The lower layer is tapped off and recycled into subsequent runs. The upper layer is methylated and hydrolyzed, and the product obtained as in Example 1.

*Example 5.—Sodium N-methyl-N-methoxyaminosulfonate, using sulfur trioxide as the sulfonating agent and methyl chloride as the alkylating agent*

An aqueous solution of sodium N-hydroxy-N-methylsulfamate is prepared as in Example 3. The stirred reaction solution is heated to 85° C.–90° C. and the reaction vessel is equipped for pressure operation. Two hundred parts of methyl chloride is added, and the resulting mixture is stirred at endogenous pressure until reaction is complete (two hours). Excess methyl chloride is removed at normal pressure, and the reaction solution allowed to cool.

The resulting aqueous solution of sodium N-methyl-N-methoxyaminosulfonate can be used directly for the applications of this invention.

In the foregoing examples it will be seen that the novel compound of the invention is usually obtained as an aqueous solution and is present as a salt. For many purposes it will be satisfactory to use the aqueous solutions thus prepared or it will be sufficient to separate the salt from the solution as by evaporation of the solvent. The products as thus produced by evaporation will ordinarily contain some sodium chloride and other impurities but these will not be objectionable for herbicidal uses.

The products can be prepared in purified form, if desired, by recrystallization from a suitable solvent such as methanol or methanol-water mixtures. It will be understood that the acid can be prepared from salts produced as shown above and that various salts can be prepared from the acid or by base-exchange.

*Example 6*

An emulsion is prepared by dissolving 25 pounds of ammonium N-methyl-N-methoxyaminosulfonate in sufficient water to give 18.75 gallons of solution; this solution is then added slowly to 6.25 gallons of No. 2 fuel oil containing 1½ quarts of a fatty alcohol amine sulfate emulsifying agent, the oil being stirred moderately during the addition. By this procedure there is obtained a water-in-oil emulsion containing 1 pound of active material per gallon.

When applied to areas containing large amounts of crabgrass and chickweed as a post-emergence spray in an amount sufficient to wet the foliage, this formulation results in complete kill of the unwanted crabgrass and chickweed.

Example 7

To 0.9 ml. of sterile nitrient medium is added 0.1 ml. of an aqueous solution containing 10,000 μg./ml. of potassium N-methoxy-N-methylsulfamic acid, followed by inoculation with *Bacillus subtilis*, a gram positive, endosporulating, rod-shaped bacterium. After incubation at 37° C. for 48 hours no growth of the micro-organism is observed.

Example 8

To 0.9 ml. of sterile nutrient medium is added 0.1 ml. of an aqueous solution containing 10,000 μg./ml. of potassium N-methoxy-N-methylsulfamic acid, followed by inoculation with *Staphylococcus aureus*, a gram-positive, coccal-shaped bacterium. After incubation at 37° C. for 48 hours no growth of the micro-organism is observed.

Examples 9–14

A like amount by weight of the following compounds are substituted for the potassium N-methoxy-N-methylsulfamic acid of Example 7. Like results are obtained.

(9) N-methoxy-N-methylsulfamic acid
(10) Sodium N-methoxy-N-methylsulfonate
(11) Ammonium N-methoxy-N-methylsulfonate
(12) Calcium N-methoxy-N-methylsulfonate
(13) Dimethylammonium N-methoxy-N-methylsulfonate
(14) Ethanolammonium N-methoxy-N-methylsulfonate

The invention claimed is:

1. A compound selected from the group consisting of N-methyl-N-methoxyaminosulfonic acid and its salts, said salt being selected from the group consisting of the calcium, sodium, potassium, ammonium, ethylammonium, dimethylammonium, trimethylammonium and ethanolammonium salts.
2. N-methyl-N-methoxyaminosulfonic acid.
3. Sodium N-methyl-N-methoxyaminosulfonate.
4. Ammonium N-methyl-N-methoxyaminosulfonate.
5. Potassium N-methyl-N-methoxyaminosulfonate.

References Cited by the Examiner

Traube et al., "Ber. de Deut. Chem Gesell.," vol. 53, pp. 1483–4 (1920).

LEON ZITVER, *Primary Examiner.*